United States Patent
Khoryaev et al.

(10) Patent No.: US 9,319,166 B2
(45) Date of Patent: Apr. 19, 2016

(54) METHOD AND APPARATUS FOR INTER-CARRIER INTERFERENCE MITIGATION IN PHASE NOISE LIMITED WIRELSS COMMUNICTION SYSTEMS

(71) Applicant: Intel Corporation, Santa Clara, CA (US)

(72) Inventors: Alexey Vladimirovich Khoryaev, Dzerzhinsk (RU); Artyom Lomayev, Nizhny Novgorod (RU); Alexander Alexandrovich Maltsev, Nizhny Novgorod (RU); Vladimir Kravtsov, Jerusalem (IL); Michael Genossar, Modiin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/994,576

(22) PCT Filed: Sep. 26, 2012

(86) PCT No.: PCT/RU2012/000780
§ 371 (c)(1),
(2) Date: Jun. 14, 2013

(87) PCT Pub. No.: WO2014/051452
PCT Pub. Date: Apr. 3, 2014

(65) Prior Publication Data
US 2015/0155961 A1    Jun. 4, 2015

(51) Int. Cl.
*H04B 15/00* (2006.01)
*H04J 11/00* (2006.01)
(Continued)

(52) U.S. Cl.
CPC .......... *H04J 11/0023* (2013.01); *H04L 1/0057* (2013.01); *H04L 1/0071* (2013.01); *H04L 27/2602* (2013.01); *H04L 27/2634* (2013.01)

(58) Field of Classification Search
CPC ...... H04B 3/32; H04B 3/23; H04L 25/03343; H04L 25/497; H04L 25/03057
USPC ................. 375/224–228, 242–254, 259–285, 375/295–315
See application file for complete search history.

(56) References Cited

U.S. PATENT DOCUMENTS

| 2009/0282315 A1* | 11/2009 | Trachewsky et al. ......... 714/755 |
| 2011/0305300 A1* | 12/2011 | Ko ............................... 375/298 |

FOREIGN PATENT DOCUMENTS

| CN | 104541466 A | 4/2015 |
| EP | 2197135 A1 | 6/2010 |

(Continued)

OTHER PUBLICATIONS

"International Application Serial No. PCT/RU2012/000780, International Search Report mailed Aug. 2, 2013", 4 pgs.

(Continued)

*Primary Examiner* — James M Perez
(74) *Attorney, Agent, or Firm* — Schwegman Lundberg & Woessner, P.A.

(57) ABSTRACT

In a wireless, OFDM system, phase noise may be mitigated through the use of an interleaver that is designed to distribute coded block bits across subcarriers of multiple OFDM symbols. Doing so decreases the non-stationary properties of the noise. Such an interleaver may be a rectangular interleaver that maps each block to a different subcarrier to create frequency diversity and to a different OFDM symbol, to create time diversity. One exemplary method of interleaving the symbols is to place a first symbol at row X and column Y of the interleaver. The next symbol is placed in row X+1 and column Y+1. The result of such an interleaving process is a great reduction in the block error rate.

18 Claims, 6 Drawing Sheets

(51) Int. Cl.
*H04L 1/00* (2006.01)
*H04L 27/26* (2006.01)

(56) References Cited

FOREIGN PATENT DOCUMENTS

| WO | WO-2008087598 | A2 | 7/2008 |
| WO | WO-2009149415 | A1 | 12/2009 |
| WO | WO-2014051452 | A1 | 4/2014 |

OTHER PUBLICATIONS

"International Application Serial No. PCT/RU2012/000780, Written Opinion mailed Aug. 2, 2013", 7 pgs.

* cited by examiner

METHOD AND APPARATUS FOR INTER-CARRIER INTERFERENCE MITIGATION IN PHASE NOISE LIMITED WIRELSS COMMUNICTION SYSTEMS

This application is a U.S. National Stage Filing under 35 U.S.C. 371 from International Application No. PCT/RU2012/000780, filed on Sep. 26, 2012, which is incorporated herein by reference in its entirety.

TECHNICAL FIELD

Embodiments pertain to wireless communications, and some embodiments pertain to orthogonal frequency division multiplexed (OFDM) communications.

BACKGROUND ART

There is a desire today for very high-speed wireless connectivity to support high-bandwidth applications, such as video. A growing area of usage is the 60 GHz band, also known as millimeter-Wave (mm Wave).

There are a number of standardization groups working on specifications for mm Wave networks, including the Wireless Gigabit Alliance (WiGig), which is developing the IEEE 802.11ad standard.

BRIEF DESCRIPTION OF THE DRAWINGS

The subject matter regarded as the invention is particularly pointed and distinctly claimed in the concluding portion of the specification. The invention, however, both as to organization and method of operation, together with objects, features, and advantages, may best be understood by reference to the following detailed description when read with the accompanying drawings, in which:

DESCRIPTION OF THE EMBODIMENTS

Figure 1:
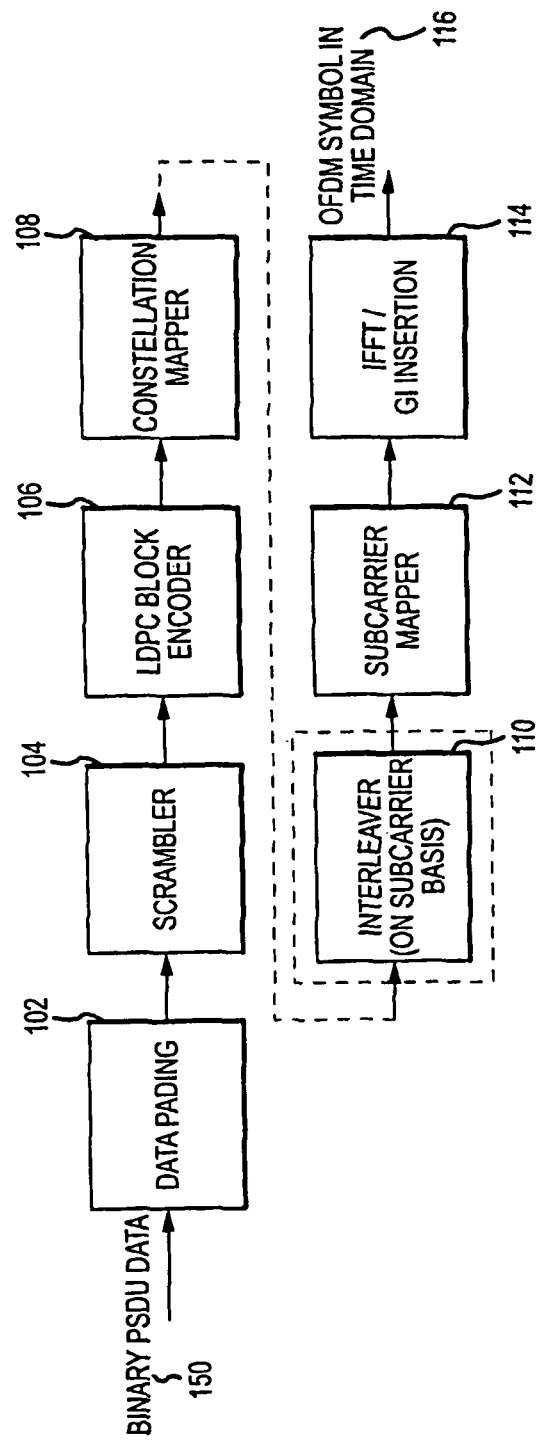
FIG. 1 illustrates a baseband signal processing pipeline.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, discussions utilizing terms such as, for example "processing," "computing," "calculating," "determining," "establishing," "analyzing," checking," and the like may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

The availability of a large unlicensed frequency band from 57 to 66 GHz (commonly known as the 60 GHz band) has made the 60 GHz band (also known as millimeter wave) attractive for the implementation of multi-Gigabits per second communication systems for the next generation of Wireless Local and Personal Area Networks (WLANs and WPANs).

The IEEE 802.11 ad working group has created specifications that aim to achieve 7 Gbps throughput in the 60 GHz, using Orthogonal Frequency Division Multiplexing (OFDM) and Single Carrier Frequency Division Multiple Access (SC-FDMA) modulation techniques. However, such a data rate is difficult to achieve due to phase noise ("PN") in 60 GHz transceiver RF front-ends implemented using CMOS technology or other IC technologies. Phase noise is currently considered as one of the main barriers to produce low-cost RFIC circuits with appropriate oscillation characteristics.

Phase noise arises from local oscillator (LO) instability and multiple carrier frequency transformation in the RF front-end chain. The effect of PN is equivalent to a random phase modulation of the carrier frequency. The equation representing carrier frequency signal in the presence of PN may be expressed as follows (also referred to as Equation 1):

$$X(t) = A \cdot \exp(j2\pi f_c t + j\phi_n(t))$$

where $f_c$ is the carrier frequency, $\phi(t)$ is a random PN process in time, and A is an amplitude of harmonic signal.

The OFDM signal is thus distorted by the phase noise, represented by an angular multiplicative term in the time domain signal.

Translated to the frequency domain, the demodulated carrier amplitude at the subcarrier with index k of the OFDM signal may be expressed as follows (also referred to as Equation 2):

$$R_k = \underbrace{X_k H_k J_0}_{CPE} + \underbrace{\sum_{l=0, l \neq k}^{N_{DFT}-1} X_l H_l J_{k-l}}_{ICI} + n_k,$$

Where $X_k$ is a QAM symbol transmitted at subcarrier k, $H_k$ is a channel complex amplitude at the subcarrier k, J is a vector representing total phase noise spectrum coefficients, $n_k$ is an additive white Gaussian noise value at the subcarrier k, and $N_{DFT}$ is the size of DFT (FFT) transform that includes the number of used data subcarriers (i.e., transmitting data or pilot signals) and zero guard band subcarriers in an OFDM symbol. The term marked CPE in the equation above is the Common Phase Error. The term marked ICI in the equation above is the Inter-Carrier Interference. The effect of the phase noise is that the phase noise introduces the CPE-$J_0$, which is identical for all subcarriers in the OFDM signal. In addition, phase noise also introduces the ICI, which depends on subcarrier index k.

Certain approaches to the problem of phase noise compensation were developed in the past. One of the approaches is based on Common Phase Error (CPE) estimation and compensation in the frequency domain using pilot signals in a number of subcarriers in the OFDM spectrum. In one of the embodiments, the estimate of CPE in this approach uses the following equation (also referred to as Equation 3):

$$\hat{CPE} = \text{angle}\left(\sum_{k=0}^{N_p-1} \hat{H}_k^* S_k^* R_k\right),$$

where $S_k$ is a known pilot signal at the subcarrier k, $H_k$ is a channel complex amplitude at the subcarrier k, $H_k$ is a channel estimation at the subcarrier k, $N_p$ is the number of pilot subcarriers defined for the OFDM symbol, * is a complex function. However, in this practical approach, the ICI term is not compensated.

A different and much more complex approach for compensating the ICI term is based on phase noise de-convolution and exploits a decision-aided scheme. In this approach, the instantaneous PN spectrum or time domain realization on a given symbol is estimated and used to compensate the negative phase noise impact. In this approach, the DA scheme is applied to iteratively improve the initial PN estimation. However, the DA schemes have high implementation complexity involving decoding that often limits their realization in practical high-throughput devices.

One approach to improve upon these methods is described below. This method may be used in combination with a CPE compensation approach briefly described above and/or ICI cancellation approaches. The further detailed description of the proposed method is provided using as an example the OFDM PHY specification developed by the IEEE 802.11ad Work Group (WiGig). However, it should be understood that the proposed method is not limited to the specification.

FIG. 1 illustrates an exemplary baseband signal-processing pipeline 100. An input signal 150 comprising binary physical layer service data unit ("PSDU") data, is received by data padding block 102, which serves to pad the input signal 150 to ensure that the data being processed is of the correct length. The signal is then processed by Scrambler block 104, which serves to create a pseudorandom bit sequence. The signal then proceeds to Low Density Parity Checksum ("LDPC") Encoder block 106, which serves to encode the data for transmission. This encoding may be a block encoding with different rates specified in the IEEE 802.11ad specification, to the code block length of 672 bits.

Thereafter, the signal is processed by Constellation Mapper block 108, which serves to map the bits of the LDPC coded data into constellations. This may performed using various modulation formats, including Spread QPSK, QPSK, 16QAM, 64QAM, and other modulation formats, either known now or developed in the future.

The signal may propagate to interleaver block 110. However, interleaver block 110 is only used when 16QAM or 64 QAM modulations are used. Interleaver block 110 serves to interleave 2 LDPC blocks in the case of 16QAM or between 3 LDPC blocks in the case of 64 QAM. The operation of interleaver block 110 will be described in further detail below.

Thereafter, the signal is processed by Subcarrier Mapper block 112, which serves to as sign the constellation symbols to a predefined set of OFDM subcarriers in the frequency domain. IFFT/GI Insertion block 114 is the final processing block, outputting signal 116 after performing a Fast Fourier Transform (FFT) that produces an OFDM signal in the time domain.

The principal behind this embodiment for phase noise impact mitigation is based on the statistical properties of ICI noise caused by PN signal distortion. For example, let us examine the effect for the case of frequency flat channel with transfer function equal to unity. In this case, the ICI noise value in Frequency Domain for subcarrier k can be measured as a difference between received signals $R_k$ defined above in Equation 2 and pure transmitted signal $X_k$ (also referred to as Equation 4):

$$\text{Noise}(k) = R_k - X_k.$$

In Equation 4, it is assumed that background noise is negligible, i.e. the thermal noise power is much less than ICI noise power. Under introduced assumptions, the CPE and ICI due to PN are the only two factors that cause the difference between signals in equation 4.

Figure 2:
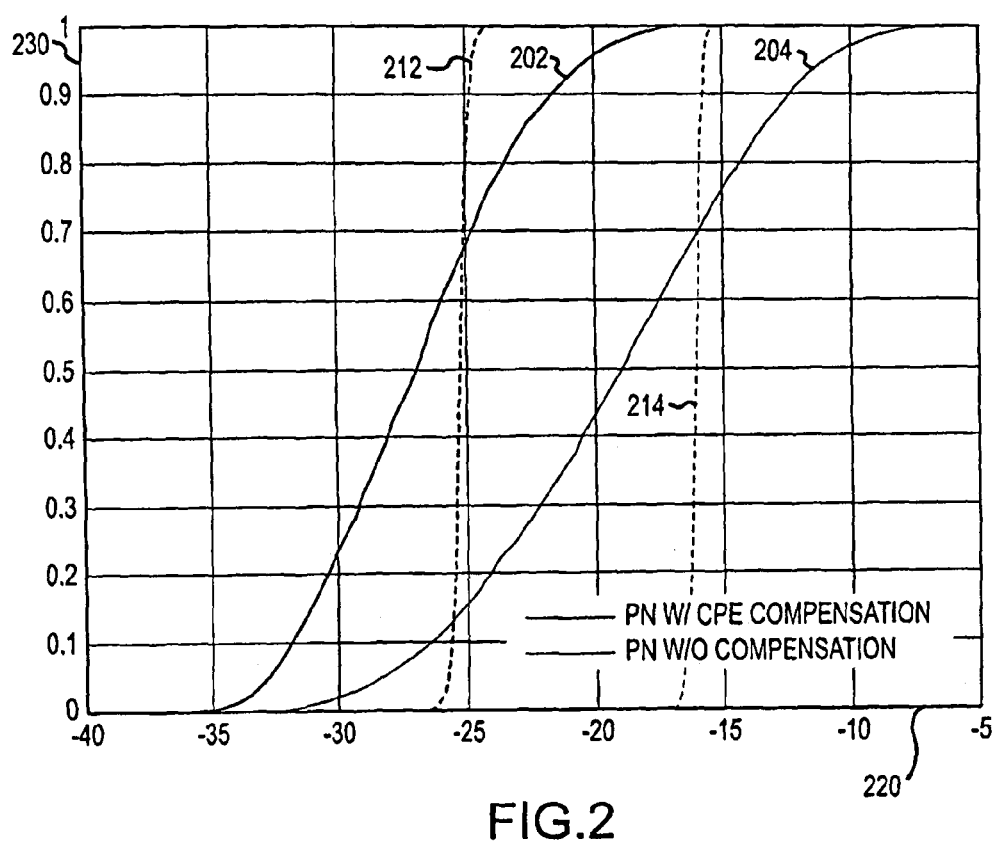
FIG. 2 is a graph comparing the cumulative distribution functions of an embodiment of the present invention.

FIG. 2 is a graph showing the effect of the CPE compensation on phase noise. In order to analyze the noise characteristics, transmission of a packet consisting of a large number of OFDM symbols may be considered. For each OFDM symbol in the packet a variance of the noise (equation 4) in Frequency Domain is estimated using 336 data subcarriers. The set of measured noise variances from each OFDM symbol can be used to plot Cumulative Distribution Functions (CDFs). Solid curve 202 in FIG. 2 represents empirical CDFs for the noise variance values in case of PN without any compensation. Solid curve 204 represents empirical CDF in the case of PN with CPE Compensation. Dashed curves 212 and 214 will be discussed later. X-axis 220 is the noise variance. Y-axis 230 is the CDF value.

Figure 3:
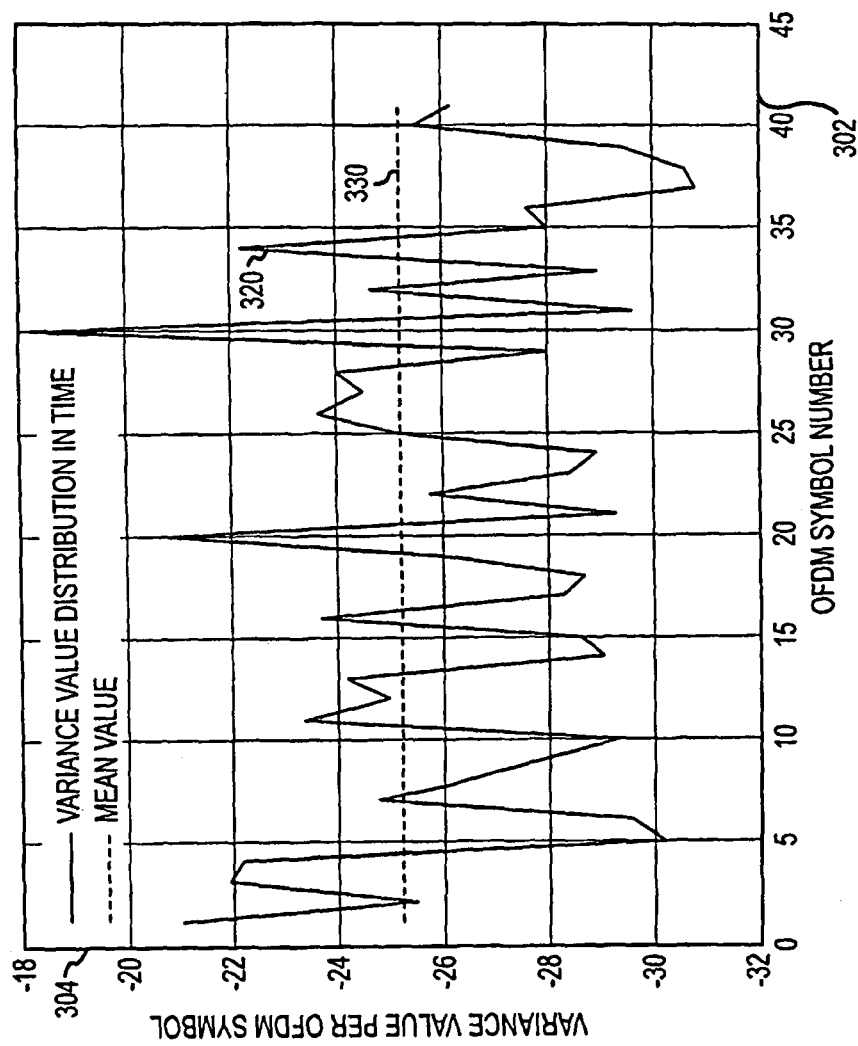
FIG. 3 is a graph illustrating the behavior of variance value per OFDM symbol distribution in time.

As it can be seen from the FIG. 2, the variance of noise (equation 4) may change significantly from one OFDM symbol to another symbol. Hence the ICI noise in Frequency Domain has essentially non-stationary properties where variance changes dramatically over time. On the other hand, it was noticed that ICI power does not change significantly over subcarriers inside one symbol. Such ICI behavior means that Phase Noise introduces boosts of ICI from one symbol to another and dramatically changes effective SNR over different OFDM symbols. FIG. 3 illustrates the behavior of variance value per OFDM symbol in time. X-axis 302 is the OFDM symbol number. Y-axis 304 is the variance value per OFDM symbol. The variance value over time is represented by line 320. The mean value of the variance is represented by line 330.

LDPC coded blocks defined in IEEE 802.11ad standard are not very large (672 bits). And for high-order modulations (16QAM or 64QAM), several LDPC coded block may be transmitted in one OFDM symbol. Hence the noise (see equation 4) can affect the whole LDPC coded block pertained to one OFDM symbol. Due to non-stationary properties of noise, its realizations with high variance substantially decrease LDPC decoder performance and increase the Packet Error Rate (PER), especially for long packets transmitted in very-high throughput communication systems.

Figure 4:
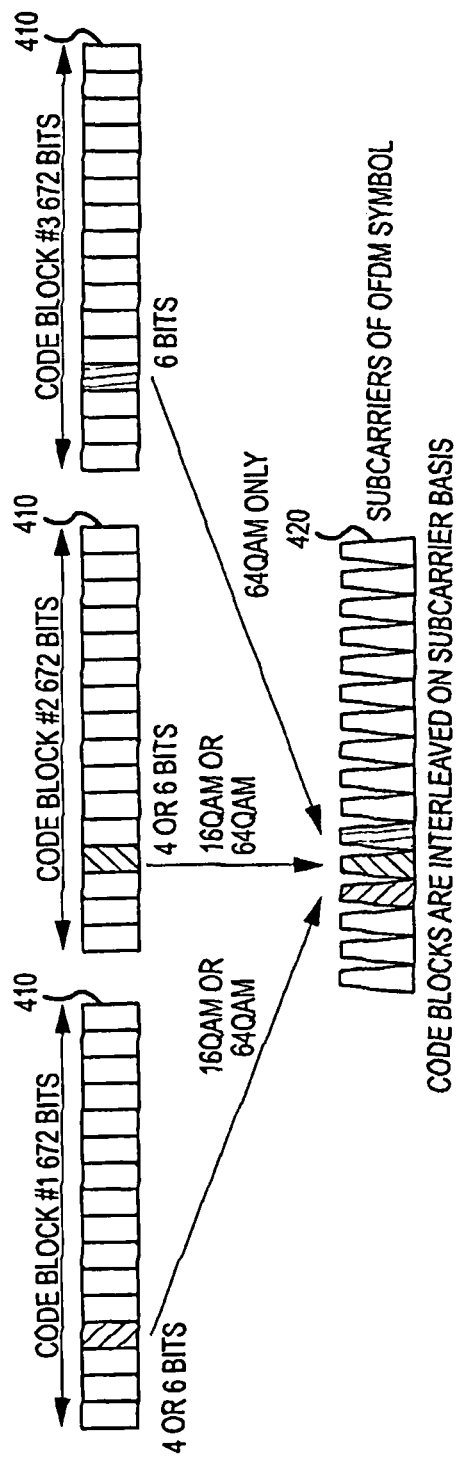
FIG. 4 illustrates the operation of an interleaver as defined in the IEEE 802.11 and specification.

Interleaving is a scheme where the order in which bits are transmitted is changed. For example, if the quality of a channel deteriorates for a period of time, if there was no interleaving, there would be a concentration of data of low quality, possibly necessitating a re-transmission in the event of interference. By interleaving the data, the portion of the bit stream affected by the deteriorated is spread out. FIG. 4 illustrates the interleaver scheme applied for 16QAM and 64QAM transmission in the IEEE 802.11ad PHY specification. FIG. 4 shows that multiple LDPC coded blocks 410 are interleaved on a subcarrier basis, but belong to the same OFDM symbol 420. Two LDPC coded blocks 410 are interleaved in the case of 16QAM modulation and three LDPC coded blocks 410 are interleaved in the case of 64QAM modulation. The result is that the interleaver design defined in the IEEE 802.11ad specification does not take into account non-stationary ICI behavior caused by phase noise.

An embodiment of the present invention disclosure distributes LDPC coded block bits (or modulation QAM symbols) across subcarriers of several OFDM symbols, in order to decrease the non-stationary properties of the noise and prevent noise realizations with high ICI boost over whole LDPC coded block.

Figure 5:
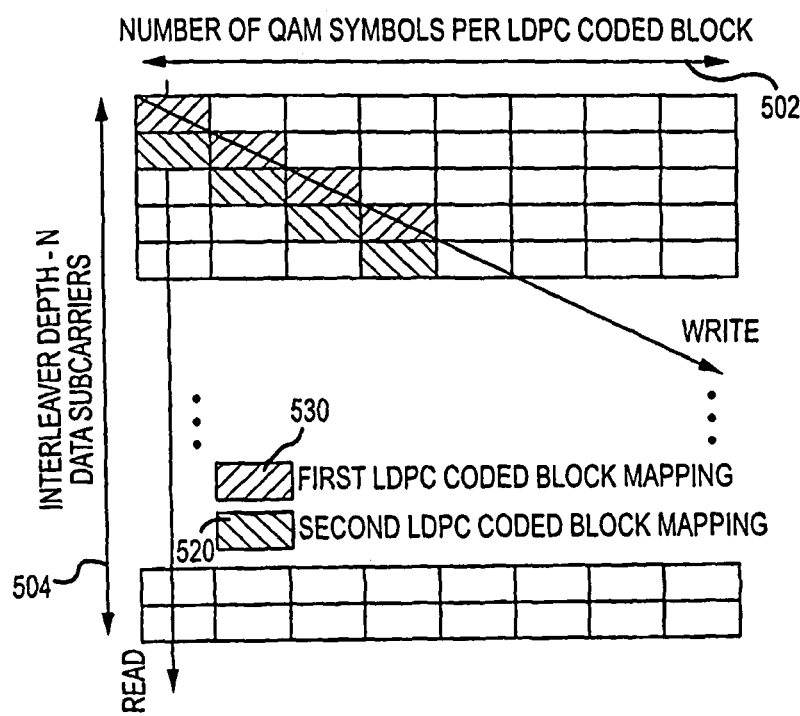
FIG. 5 illustrates the operation of an interleaver of an embodiment of the present invention.

This approach may be realized applying different schemes. One possible scheme implementing the proposed method represents a symbol basis rectangular interleaver shown in FIG. 5. A symbol-basis rectangular interleaver has the dimensions N×LDPS coded block length in QAM symbols. N is the interleaver depth equal to the number of data subcarriers in OFDM symbol (336 in case of IEEE 802.11adPHY). In the case of 16QAM LDP, the coded block length is equal to 168 symbols. In the case of 64QAM LDPC, the coded block length is equal to 112 symbols. In this scheme, LDPC coded blocks mapped to 16QAM or 64QAM symbols are written to the interleaver as shown in FIG. 5. After that process is completed, QAM symbols are read from the interleaver memory in column-by-column basis and mapped to OFDM subcarriers. In this interleaving approach, all QAM symbols inside one LDPC block are mapped to different subcarriers (frequency diversity) and different OFDM symbols (time diversity). In these embodiments, the dimensions of the interleaver are variable and may be dynamically selected based on the number of data subcarriers in an OFDM symbol and the LDPC coded block.

To explain the interleaver in more detail, the number of rows in the interleaver is equal to the number of data subcarriers in an OFDM symbol. The number of columns in the interleaver is equal to the coded block length of a symbol. The first symbol placed in the interval is placed in row X, column Y. The immediately following symbol is placed in row X+1, column Y+1. Thereafter, the row number and column number are increased by one for each symbol, until the last row or column is reached.

When data is read from the interleaver to be transmitted, it is read on either a row-by-row basis or a column-by-column basis. Since each row (or column) in the interleaved data contains data from many different symbols, errors are more broadly distributed can be more easily corrected via error correction techniques.

In an exemplary system, the number of rows is equal to 336 and the number of columns is equal to 112 or 168, depending on the modulation. When column 112 or 168 (depending on the modulation) is reached, the next symbol is placed in column 1, while the row number is increased as described above.

When the next LDPC coded block is placed in the interval, a similar scheme can be followed, with the first symbol of the next LDPC coded block being placed in the first available row in the first column. Thereafter, the row and column numbers are increased as described above.

While the above descriptions refer to the row and column being increased by 1 for each symbol, it should be understood that the row and/or column numbers may be increased by any amount. In addition, while a rectangular interleave was described, it should be understood that other types of interleaving are also possible.

With reference again to FIG. 2, dashed curves 212 and 214 in FIG. 2 represent empirical CDFs for the noise variance values in the case when in the OFDM PHY pipeline (see FIG. 1), interleaver 110 was replaced with the interleaver shown in FIG. 5. New distributions for noise variance per OFDM symbol have the same mean value, but a much smaller variance. It means that the noise (equation 4) has essentially stationary, properties and its variance does not change much from one OFDM symbol to another.

Figure 6:
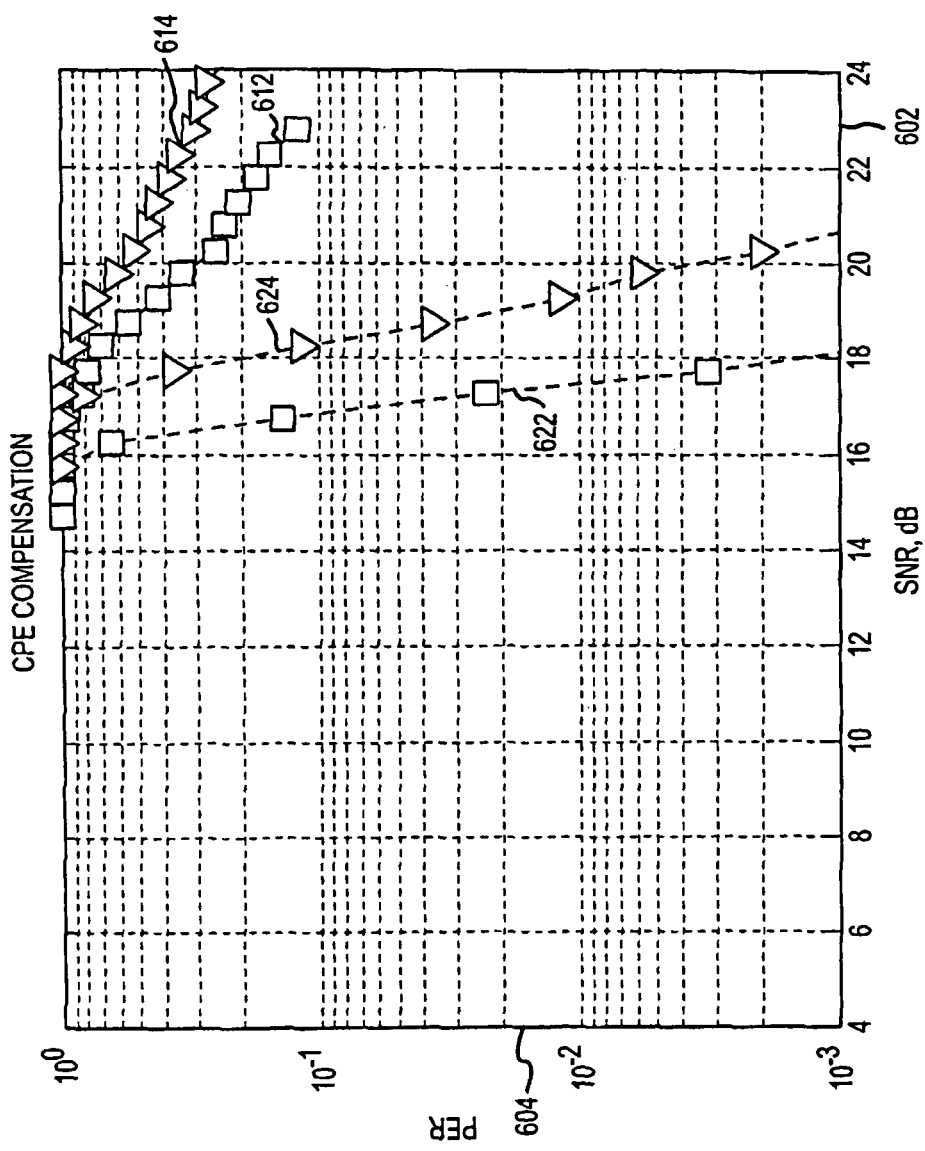
FIG. 6 is a graph comparing the packet error rate of various interleavers.

Application of interleaver scheme shown in FIG. 5 instead of the current IEEE 802.11ad interleaver allows significantly improved packet error rate (PER) performance. FIG. 6 shows comparison of PER characteristics for OFDM high data rate transmission in AWGN channel in presence of PN for current IEEE 802.11ad interleaver design and proposed interleaver design for phase noise impact mitigation. X-axis 602 represents the signal to noise ratio, in decibels. Y-axis 604 shows the PER. Curves 612 and 614 show the PER when the 802.11ad interleaver is used. Curves 622 and 624 show the PER when the interleaver of an embodiment of the present invention is used. As seen in FIG. 6, the PER when the interleaver of FIG. 5 is used is much improved over the 802.11ad interleaver.

Note that the method proposed in this invention disclosure may be implemented using different schemes and is not limited to the rectangular interleaver design shown in FIG. 5. Moreover, the interleaver depth N shown in FIG. 5 may be chosen from memory/latency tradeoff considerations in practical implementation. Possible schemes implementing the proposed method may be placed instead of interleaver 110 or after LDPC encoder 106 and before constellation mapper 108 in Error! Reference source not found.

Although the present invention has been described in connection with some embodiments, it is not intended to be limited to the specific form set forth herein. For example, although certain embodiments discuss the use of LDPC encoding it should be understood that any type of encoding may be used. In addition, although certain embodiments discuss certain block lengths, it should be understood that the embodiments listed here are not so limited.

The following examples pertain to further embodiments.

An interleaver in an OFDM system may comprise: a processor arranged to determine a number of data subcarriers in an OFDM symbol, wherein; the processor is further arranged to determine the number of symbols in a coded block, wherein each coded block comprises a plurality of symbols with a coded block length; the processor is further arranged to map encoded blocks such that each symbol is written to a different row and a different column from the immediately preceding symbol; and wherein the processor is further arranged to map encoded blocks such that each symbol is written to a different row and a different column from the immediately preceding symbol; and wherein the processor is further arranged to map encoded blocks such that each symbol is written to a different row and a different column from the immediately preceding symbol; and wherein the interleaver utilizes a number of rows equal to the number of data subcarriers and a number of columns equal to the coded block length.

The interleaver may have 336 rows. The number of columns in the interleaver may be either 112 or 168.

In some embodiments, the second processor of the interleaver is arranged to map coded blocks such that a symbol is assigned to a row X and a column Y of the interleaver. Furthermore, the second processor may be arranged to map the immediately following symbol in the coded block to row X+A and column Y+B. In some embodiments, A=1 and B=1. In some embodiments, the coded blocks are LDPC encoded blacks.

A wireless transmitter for processing OFDM baseband signals may comprise: a first processor arranged to perform data padding; a scrambler arranged to create a pseudorandom bit sequence; an encoder arranged to perform block encoding; a constellation mapper arranged to perform constellation mapping on the block encoded data; an interleaver; a subcarrier mapper arranged to perform subcarrier mapping; and a second processor arranged to perform Fast Fourier Transforms. The interleaver has a number of rows equal to the number of data subcarriers and a number of columns equal to the coded block length. The interleaver is arranged to determine a number of data subcarriers in an OFDM symbol; determine the number of symbols in the coded block, wherein each coded block comprises a plurality of symbols; and map encoded blocks such that each symbol is written to a different row and a different column from the immediately preceding symbol. The number of rows may be 336 and the number of columns may be 112 or 168.

The interleaver is arranged to map LDPC encoded blocks such that a symbol is assigned to a row X and a column Y of the interleaver; and the interleaver is arranged to map the immediately following symbol in the LDPC block to row X+A and column Y+B. A may be equal to 1 and B may be equal to 1. The transmitter may be arranged to transmit waves in the 60 GHz band. The encoder may be arranged to perform LDPC encoding.

A method of interleaving data in an OFDM system may comprise: determining a number of data subcarriers in an OFDM symbol; determining the number of symbols in an coded block, wherein each coded block comprises a plurality of symbols; creating an interleaver with a number of rows equal to the number of data subcarriers and a number of columns equal to the coded block length; and mapping encoded blocks such that each symbol is written to a different row and a different column from the immediately preceding symbol.

The mapping may comprise: assigning a symbol to a row X and a column Y of the interleaver and assigning the immediately following symbol in the LDPC block to row X+A and column Y+B. A and B may both be equal to 1.

If X+A is greater than the number of rows in the interleaver, the following symbol is assigned to a predetermined row. If Y+B is greater than the number of columns in the interleaver, the immediately following symbol is assigned to a predetermined column. In some embodiments, data is read from said rectangular interleaver in a column-by-column basis. In other embodiments, the coded blocks may be LDPC coded.

While certain aspects of the invention were discussed with respect to WiGig, it should be understood that the concepts taught in this disclosure may be applied to many different types of systems.

One skilled in the art would recognize that various features of the described embodiments might be combined in accordance with the invention. Moreover, it will be appreciated that various modifications and alterations may be made by those skilled in the art without departing from the spirit and scope of the invention.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. An interleaver in an OFDM transmitter, comprising:
a processor configured to:
determine a number of data subcarriers in an OFDM symbol;
determine a number of symbols in at least one coded block, wherein each of the coded blocks comprises a plurality of symbols with a particular coded block length; and
map each of the coded blocks to memory such that each successive symbol is written to a different row and a different column from an immediately preceding symbol, wherein the number of rows is equal to the number of data subcarriers and the number of columns is equal to the coded block length, and wherein the number of columns is selected from the group consisting of 112 and 168; and
output the written symbols of the coded blocks via a column-by-column basis, or a row-by-row basis, to at least one subsequent circuit of the OFDM transmitter.

2. The interleaver of claim 1 wherein the number of rows is 336.

3. The interleaver of claim 1 wherein:
said processor is further configured to map the coded blocks such that when a particular symbol of the plurality of symbols is assigned to row X and column Y of the memory than the immediately following symbol in the same coded block is assigned to row X+A and column Y+B.

4. The interleaver of claim 3 wherein A=1 and B=1.

5. The interleaver of claim 1 wherein the coded blocks are LDPC coded blocks.

6. A wireless transmitter for processing OFDM baseband signals comprising:
an encoder configured to perform block encoding to generate block coded data including at least one coded block;
a constellation mapper configured to perform constellation mapping on the block coded data in order to generate symbols;
an interleaver configured to:
determine a number of data subcarriers in an OFDM symbol;
determine the number of symbols in each of the coded blocks, wherein each of the coded blocks comprises a plurality of the symbols with a particular coded block length; and
map each of the coded blocks to memory such that each symbol of a particular coded block is written to a different row and a different column than the immediately preceding symbol of the same coded block, wherein the number of rows is equal to the number of data subcarriers and the number of columns is equal to the coded block length, and wherein the number of columns is selected from the group consisting of 112 and 168;

output the written symbols of the coded blocks via a column-by-column basis, or a row-by-row basis, thereby generating interleaved symbols;

a subcarrier mapper configured to perform subcarrier mapping on the interleaved symbols, thereby generating subcarrier mapped symbols; and a second processor configured to perform an Inverse Fast Fourier Transform on the subcarrier mapped symbols, thereby generating a time domain OFDM symbol that is transmitted using subsequent circuitry of the wireless transmitter.

7. The transmitter of claim 6 wherein the number of rows is 336.

8. The transmitter of claim 6 wherein:
said interleaver is further configured to map LDPC coded blocks such that when a particular symbol is assigned to row X and column Y of the memory, the immediately following symbol in the LDPC coded block is assigned to row X+A and column Y+B.

9. The transmitter of claim 8 wherein A=1 and B=1.

10. The transmitter of claim 6 wherein the transmitter is configured to transmit waves in the 60 GHz band.

11. The transmitter of claim 6 wherein the encoder is configured to perform LDPC encoding.

12. A method of interleaving data in an OFDM transmitter comprising:
determining, using the OFDM transmitter, a number of data subcarriers in an OFDM symbol;
determining, using the OFDM transmitter, a number of symbols in at least one coded block, wherein each of the coded blocks comprises a plurality of symbols with a particular coded block length;
creating, using the OFDM transmitter, an interleaver matrix in memory with a number of rows equal to the number of data subcarriers and a number of columns equal to the coded block length, wherein the number of columns is selected from the group consisting of 112 and 168; and
mapping each of the coded blocks such that each successive symbol is written to a different row and a different column from the immediately preceding symbol in the interleaver matrix;
outputting the written symbols of the coded blocks via a column-by-column basis, or a row-by-row basis, to at least one subsequent circuit of the OFDM transmitter.

13. The method of claim 12 wherein said mapping further comprises:
assigning a particular symbol to row X and column Y, and then assigning the immediately following symbol in the same coded block to row X+A and column Y+B.

14. The method of claim 13 wherein A=1 and B=1.

15. The method of claim 13 further comprising:
if X+A is greater than the number of rows in the interleaver matrix, then assigning the immediately following symbol to a predetermined row.

16. The method of claim 13 further comprising:
if Y+B is greater than the number of columns in the interleaver matrix, then assigning the immediately following symbol to a predetermined column.

17. The method of claim 12 wherein the interleaver matrix is a rectangular interleaver matrix.

18. The method of claim 12 wherein each of the coded blocks is coded using LDPC.

* * * * *